United States Patent [19]

Quartaert

[11] Patent Number: 5,115,734
[45] Date of Patent: May 26, 1992

[54] METHOD FOR MAKING HARVEST PRODUCT ROLL BALES AND APPARATUS FOR PERFORMING THE METHOD

[76] Inventor: Petrus M. Quartaert, Berg 73, 5671 CB Nuenen, Netherlands

[21] Appl. No.: 527,531

[22] Filed: May 23, 1990

Related U.S. Application Data

[63] Continuation-in-part of Ser. No. 254,466, Oct. 6, 1988, abandoned.

[30] Foreign Application Priority Data

Oct. 14, 1987 [DE] Fed. Rep. of Germany ...... 37-34850

[51] Int. Cl.$^5$ .................... B65B 63/04; A01D 39/00
[52] U.S. Cl. .......................... 100/5; 53/587; 56/341; 100/88
[58] Field of Search .............. 100/5, 87–89; 53/118, 587; 56/341, 342, 343

[56] References Cited

U.S. PATENT DOCUMENTS

| | | | |
|---|---|---|---|
| 3,914,926 | 10/1975 | Braunberger et al. | 56/341 |
| 4,499,714 | 2/1985 | Hollmann | 56/341 |
| 4,510,861 | 4/1985 | Campbell et al. | 100/88 |
| 4,514,969 | 5/1985 | Moosbrucker et al. | 100/88 X |
| 4,542,617 | 9/1985 | Sonntag | 100/88 X |
| 4,579,052 | 4/1986 | Schaible | 100/5 |
| 4,580,398 | 4/1986 | Bruer et al. | 100/5 X |
| 4,597,249 | 7/1986 | Bowden, Jr. | 56/341 X |
| 4,604,855 | 8/1986 | Krone et al. | 53/587 X |
| 4,625,502 | 12/1986 | Gerhardt et al. | 100/88 X |
| 4,656,812 | 4/1987 | Busse et al. | 53/587 X |
| 4,686,812 | 8/1987 | Bruer et al. | 53/587 X |

FOREIGN PATENT DOCUMENTS

| | | | |
|---|---|---|---|
| 2443838 | 4/1976 | Fed. Rep. of Germany | 100/88 |
| 2634638 | 2/1978 | Fed. Rep. of Germany | 53/118 |
| 3415310 | 10/1985 | Fed. Rep. of Germany | 100/89 |
| 3428904 | 2/1986 | Fed. Rep. of Germany | 100/89 |
| 3437294 | 4/1986 | Fed. Rep. of Germany | 100/89 |

Primary Examiner—Harvey C. Hornsby
Assistant Examiner—Stephen F. Gerrity

[57] ABSTRACT

There is provided a baler 1 having a press chamber 4 with press element 9 driven in a coiling direction and an ejector lid 12. A swath feed element 6 is mounted at the entrance of the feed passage 5. A continuously driven press cylinder having press blades is a second feed element and is mounted intermediate the feed element 6 and the press chamber inlet 8. A tying material device 22 is located downstream of the inlet 8. A separator 20 is mounted to operate between the second feed element 7 and the inlet 8 from an inoperative position outside of the feed passage to an operative position across the feed passage. The separator divides cut harvest product baled in the press chamber from cut harvest product being pre-stored in the feed passage 5. The separator, for instance, is a coiled web which can be extended to move from the feed passage through the inlet 8 and into the press chamber as cut harvest product is being continuously fed to the feed passage 5. When the roll bale is completed, tied and ejected from baler and the press chamber reclosed, the separator is returned to its inoperative position to allow the feed product being held thereby to discharge into the press chamber and to be formed into a roll bale.

25 Claims, 9 Drawing Sheets

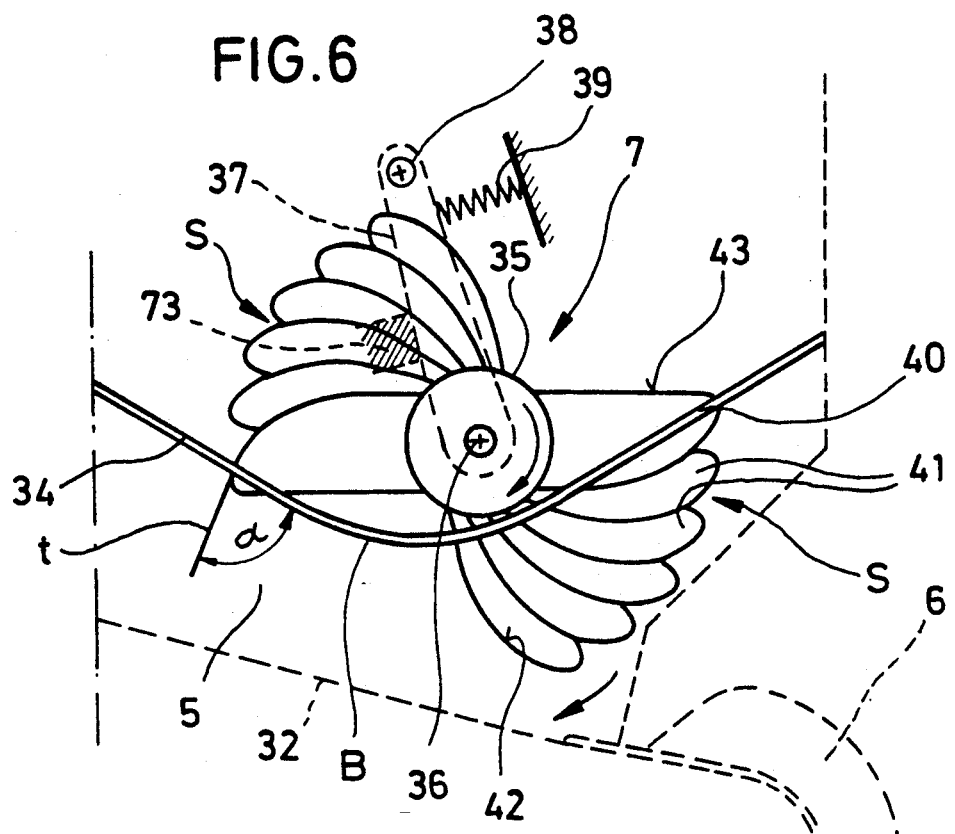
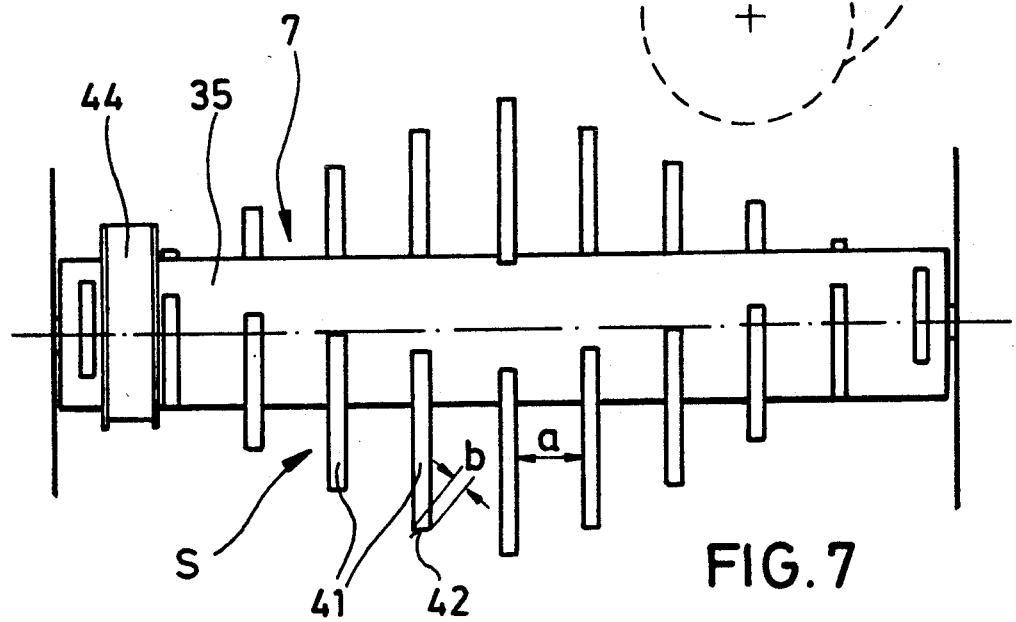

5,115,734

METHOD FOR MAKING HARVEST PRODUCT ROLL BALES AND APPARATUS FOR PERFORMING THE METHOD

This is a continuation-in-part application of my U.S. application 07/254,466 filed Oct. 6, 1988 (now abandoned).

The present invention relates to an apparatus and method for making tied harvest product roll bales in the press chamber of a roll baler. The roll baler has a chamber which is normally closed but can be opened for ejecting a finished roll bale. The roll bale is continuously formed, tied and ejected from the roll baler. Our method provides continuous operation of a roll baler by continuously supplying harvest product swath to the roll baler, continuously forming, tying and ejecting roll bales from the baler by temporarily pre-storing incoming harvest product separately under compression during and after the roll bale is tied, having at least a portion of the prestored product enter the roll baler press chamber, and then releasing the compressed prestored harvest product into the press chamber after the feed roll therein has been ejected and the press chamber closed.

German application 34 15 310, shows the temporary prestoring of the continuously supplied harvest product swath in a single step in an antechamber outside the press chamber. The core bale is made in the antechamber, then passed into the press chamber after the press chamber has been closed and after the previously finished roll bale has been tied with tying material and ejected from the press chamber. Together with the apparatus required for making the core bale, the antechamber must be of a certain size to enable it to accommodate the volume of the harvest product supplied thereto during the prestoring period. This results in a heavy and bulky roll baling press.

German Patent 33 11 330, shows feeding the harvest product to the press chamber and temporarily interrupted the feed until the leading end of the tying material on the finished roll bale overlaps with the trailing end of the tying material adjacent the inlet opening of the press chamber. The press chamber is opened and the finished and tied roll bale is then ejected rearward. After the finished roll bale has been ejected from the press chamber, the core bale formed in the antechamber during the pre-storing period is transferred into the press chamber by reversing the direction of rotation. The presence of the antechamber results in heavy and bulky construction of the roll baling press.

Neither of the above two known methods permits the core bale to be transferred from the antechamber into the press chamber as long as the finished and tied roll bale is still at least partially within the press chamber. Their baler must do this, otherwise, the core bale could then immediately follow the ejected finished roll bale through the opening of the press chamber, or could adhere to the finished roll bale and be entrained thereby as it is being ejected. Irrespective of a possible reversal of the coiling direction in the press chamber, the relatively voluminous core bale would immediately find its way rearward through the opening of the press chamber under the influence of gravity.

German application 24 43 838 shows the completely coiled, finished roll bale is wrapped with tying material and subsequently ejected. The tying and ejection operations are carried out in an unhampered manner. The roll baling press is stopped, or the feeding of the harvest product is interrupted for this period. This results in a discontinuous operation of the roll baling press, which is particularly disadvantageous in practice. Unlike this prior art, our roll baling press needs only a relatively short feed passage which results in an advantageous compact roll baler which is highly maneuverable and can be pulled by a small tractor.

U.S. Pat. No. 4,597,249 shows incoming harvest product is pre-stored in one continuous step until the roll bale is already finished. That apparatus and method does not allow tying the finished roll bale prior to its ejection from the press chamber.

It is an object of the present invention to provide a method and apparatus for continuously baling, rolling and tying roll bales to provide high productivity with a roll baler of simple construction, good maneuverability and low weight.

The pre-storing of the harvest product under compression in the feed passage during the first step permits the tying material to be reliably tied without interference. This occurs even if the tying material is to have a relative long overlap on the periphery of the roll bale. The compression of the harvest product in the feed passage permits a compact construction of the feed passage. This results in compact dimensions of the baler as a whole. In the second step, the harvest product is also pre-stored in the press chamber, but separately from the finished roll bale. This provides a relatively long buffer period for the ejection of the roll bale and the orderly closing of the press chamber. The harvest product is prevented from dropping out of the press chamber during the second pre-storing step. During the first step, the volume of the feed passage is utilized without the provision for a special antechamber, while in the second step part of the volume of the press chamber is utilized for the pre-storing operation.

During both pre-storing steps, the continuously fed harvest product swath is not left to itself, but is handled in a controlled manner during both steps. The coiling of the new roll bale can be commenced without interruption as soon as the press chamber is closed. In the second step of the pre-storing operation, the press chamber is used without permitting the harvest product to drop out through the press chamber. The ejection of the roll bale and the closing of the press chamber can be carried out slowly and in a cautious manner to prevent damage to the roll bale and the movable components of the baler. This is possible because a relatively large amount of the harvest product can be handled in the second pre-storing step even in the absence of an ante-chamber.

The advantage achieved by our apparatus is the elimination of an antechamber for the formation of a core bale. In our method, the first pre-storing step is for a relatively short period of time. The volume of a substantially conventional feed passage is sufficient to pre-store the continuously fed harvest product, until the inlet of the press chamber is again opened and the second pre-storing step in the press chamber is initiated. Our invention eliminates the need for a pre-storage chamber above the feed passage and results in a more compact, lightweight and highly maneuverable roll baler irrespective of its continuous operation. Our roll baler press need not be bulkier and heavier than a roll baler for discontinuous operation as described for instance in German application 24 43 838.

A further modification of our invention is to permit the coiling of the next roll bale to be commenced substantially without delay by compressing the harvest product also during the second pre-storing step. This has the additional effect that the full amount of the pre-stored harvest product, which may be relatively large for obtaining a buffer period of sufficient duration, occupies only a fraction of the capacity of the still open press chamber.

From FIG. 1 of German patent 33 11 330, there is shown a secondary feed element in the form of a picker which has rake prongs projecting transversely through the feed passage for intermittently feeding the harvest product picked up by the first feed element through the inlet into the press chamber. During the tying of the finished bale the secondary feed element is retained in a back-up position to thereby interrupt the supply of the harvest product to the press chamber until the tying material is wrapped about the finished bale with a sufficient overlap. The harvest product picked up by the first feed element during this interval is stored in a pre-storing chamber provided for this purpose at the front of the baler. The first feed element with its prongs is not capable, however, of compressing the harvest product to any substantial degree. Therefore, the pre-storing chamber has to have a very large volume for accommodating a sufficiently large amount of the harvest product. Thus, the overall dimensions of the baler in the longitudinal direction as well as its total weight are unsuitably increased. The coiling direction in the press chamber is selected so that the harvest product entering through the inlet is immediately carried upwards to avoid its being thrown out from the open press chamber. Thus, as the size of the roll bale grows, the picker brings successive harvest product charges into pressure contact with the periphery of the roll bale, so that they are subsequently carried upwards. The periphery surface of the roll bale closes the inlet and moves in a direction substantially opposite to the feeding direction of the harvest product. This may result in the harvest product being backed up at the inlet, so that the productivity of the baler is impaired. When the harvest product is introduced in individual charges, the size of the roll bale grows. The bale roll may become inhomogeneous and of irregular shape, resulting in varying stresses acting on the press elements and thus requiring a very stable and heavy mounting arrangement therefor. It is an additional object of the invention to improve an apparatus of the type defined above so as to result in a more compact, more productive and simpler construction as compared to known balers. This is attained with a baler in which the second feed element is a continuously driven press roller equipped with press elements and in which the separator element is separate therefrom and adapted in its back-up position to be moved together with the harvest product through the inlet into the press chamber. The press roller feeds the harvest product picked up and continuously supplied by the first feed element to the press chamber in the form of a strong and uniform swath, resulting in a homogenous composition of the roll bale. During the pre-storing operation in the back-up position of the separator element, the press roller rather than the first feed element is responsible for the pickup of the harvest product. This causes the compaction of the harvest product to such a degree, that a relatively short and narrow feed passage as usually provided in a discontinuously operable roll baler is sufficient for this step of the pre-storing operation. The compression in the feed passage by the press roller permits a sufficient amount of the harvest product to be pre-stored in the feed passage. This permits the unhampered pickup operation of the first feed element to be continued and the tying material to be reliably tied. Additional pre-storing space is then immediately provided as soon as the roll bale has been tied, the ejection of the finished roll bale initiated, and the press chamber has been closed. The pre-storing space is extended into the press chamber by the displacement of the separator element through the inlet into the press chamber. There is no danger of the harvest material dropping out from the open press chamber or adhering to the finished roll bale as it is being ejected. As the separator element is pushed into the press chamber by the harvest product, it exerts a desirable ejection force on the finished roll bale. The press roller permits a high feeding rate for the coiling operation to be achieved, and thus a high productivity of the baler. The volume of the roll bales may be selected to be rather large, even if the dimensions of the feed passage as well as those of the inlet are desirably small and compact. As soon as the press chamber has been closed again, the coiling of the next roll bale can be continued without delay. Since the separator element prevents the harvest product from dropping out up to this time, the thus provided buffer period is sufficient for permitting the finished roll bale to be ejected in a cautious manner, and the press chamber to be slowly closed. The coiling direction in the press chamber is of no importance. It may thus be selected in the most suitable manner with respect to the construction of the baler and the quality of the roll bales. The coiling direction may also be selected so that the harvest product swath enters the press chamber substantially tangential to the roll bale and along an extension of the feed passage disposed at a low level, to thereby avoid the disadvantageous upwards deflection of the harvest product swath of prior art solutions and to promote the formation of the core for the new roll bale.

Even if there is only a short distance from the press chamber inlet to the open side of the press chamber, the separator element reliably prevents the harvest product from dropping out as the press chamber is slowly closed. This pre-storage principle using the press roller and the separator element may also be used in combination with press chambers of fixed or variable volume.

According to a further object of the present invention, flexible web is provided to accurately define the space for pre-storing and compression of the harvest product in the feed passage without hampering the tying of the finished roll bale. The loop of the web subsequently projecting into the press chamber is capable of readily adapting itself to the conditions within the press chamber and to the volume of the harvest product to be pre-stored. The web provides an enclosed pre-storing space within the open press chamber.

Still a further object is to provide a retainer which is operable to advance the free end of the web transversely through the feed passage when the latter has to be closed for permitting the tying of the roll bale. The releasable attachment of the free end to the retainer permits the free end of the web to be retracted after the press chamber has been closed. Thus, the web no longer interferes with the baling operation.

Still another object of our invention is to provide an effective compression of the harvest product in the feed passage. The press roller is capable of continuously effecting a high compaction of the harvest product. Thanks to its support, initially in the feed passage and subsequently, after the tying material has been brought on the periphery of the finished roll bale, the web is capable of producing the counter-pressure required for the compaction of the harvest product. Since the harvest product during its compression moves towards the inlet together with the web, there is no danger of a back-up of the harvest product in the feed passage. The formation of the next roll bale can be commenced without delay and with an invariable feeding rate after the press chamber has been closed. The high feeding rate through the feed passage and thus the high operating speed of the baler are also a result of the substantially continuous action of the press roller. The press roller acts to compress the harvest product during the pre-storing operation, and to continuously accelerate the feeding rate during the remainder of the time.

According to a further object of the present invention, the retainer provided ought to be capable of readily gripping the catch element by retaining claws and hold the catch element solely by the tension of the web resulting from the pressure of the compacted harvest product, while a uniform support of the web over the full width of the feeding passage is ensured.

According to a further object of the present invention a mechanism including a thrust fork can be accommodated in a narrow space outside of the press chamber in the stationary part of the baler. The drive transmission is very simple and requires only a small number of movable components.

It is a further object of the present invention to use a web of a semi-rigid nature with high tension strength which may be bent without warping formation of any longitudinal creases.

A further object of the present invention is to prevent undue frictional forces from the press elements acting on the web. For that reason, a deflector device is useful.

According to a further object of the present invention, a tying material feed device is provided. This has a tying material store mounted in a stationary front portion and cooperates with a press element in the press chamber for feeding the tying material and applying it to the periphery of the roll bale. Also, it a feed roller which is rotatably driven in a particularly simple and effective manner. As soon as the feed device has been moved to the feeding position, one of the press elements in the press chamber is used for driving the feeding roller, causing it to apply the tying material to the periphery of the roll bale. After the feed device has been returned to the inoperative position, the thus created space is sufficient for separating the tying material as by means of a cutting device provided for this purpose. The feed roller gap is effective to apply the tying material to the periphery of the roll bale in a uniform manner over the full width of the press chamber, to thereby ensure that also the end portions of the roll bale are securely tied.

The tying 5 material is wound on a winding core and is itself used as the feed roller to be driven by the press element for applying the tying material to the roll bale.

According to still another object of this invention, a back-up roller is provided parallel to the feed roller. The back-up roller is resiliently biassed against the feed roller to form an additional feed roller gap therewith to thus ensure uniform feeding of the tying material over the full width. The rotation of the back-up roller may for instance be derived from the press element in the press chamber via the feed roller.

In still another object of the present invention, the separation of the longitudinal sections of the tying material can be accomplished in a particularly simple manner when the sections are interconnected at rated breaking point, or are separately wound in an overlapping arrangement. It has only to be ensured that the rated breaking point or the overlapping portions are always separated downstream of the feed roller, so that the free end of the tying material is held in readiness for the next feeding operation. The braking device ensures that the traction exerted on the tying material by the roll bale causes the tying material to break at the rated breaking point, or the overlapping ends of two successive tying material sections to be pulled apart.

Another embodiment of our apparatus is where the web is replaced by a rake wall operable to interrupt the supply of the harvest product to the press chamber during the interval required for securing the tying material. The rake wall ought to be capable of absorbing the pressure acting thereon by the compression of the continuously fed harvest product by the press roller. Under the control of the compression force or by mechanical means the separator element is displaced substantially parallel to itself into the press chamber.

According to a further object, one rake member in the feed passage performs the pre-storing function only during the interval required for securing the tying material, while another rake member in the press chamber is operative until the press chamber is closed. The harvest product is thus passed on from one rake member to the other rake member in a manner preventing it from interfering with the tying and the ejection of the roll bale.

DESCRIPTION OF THE DRAWINGS

FIG. 6 is a cross-sectional view of a detail, FIG. 7 is a view of the same detail rotated about 90°.

DESCRIPTION OF THE PREFERRED EMBODIMENT

Figure 1:
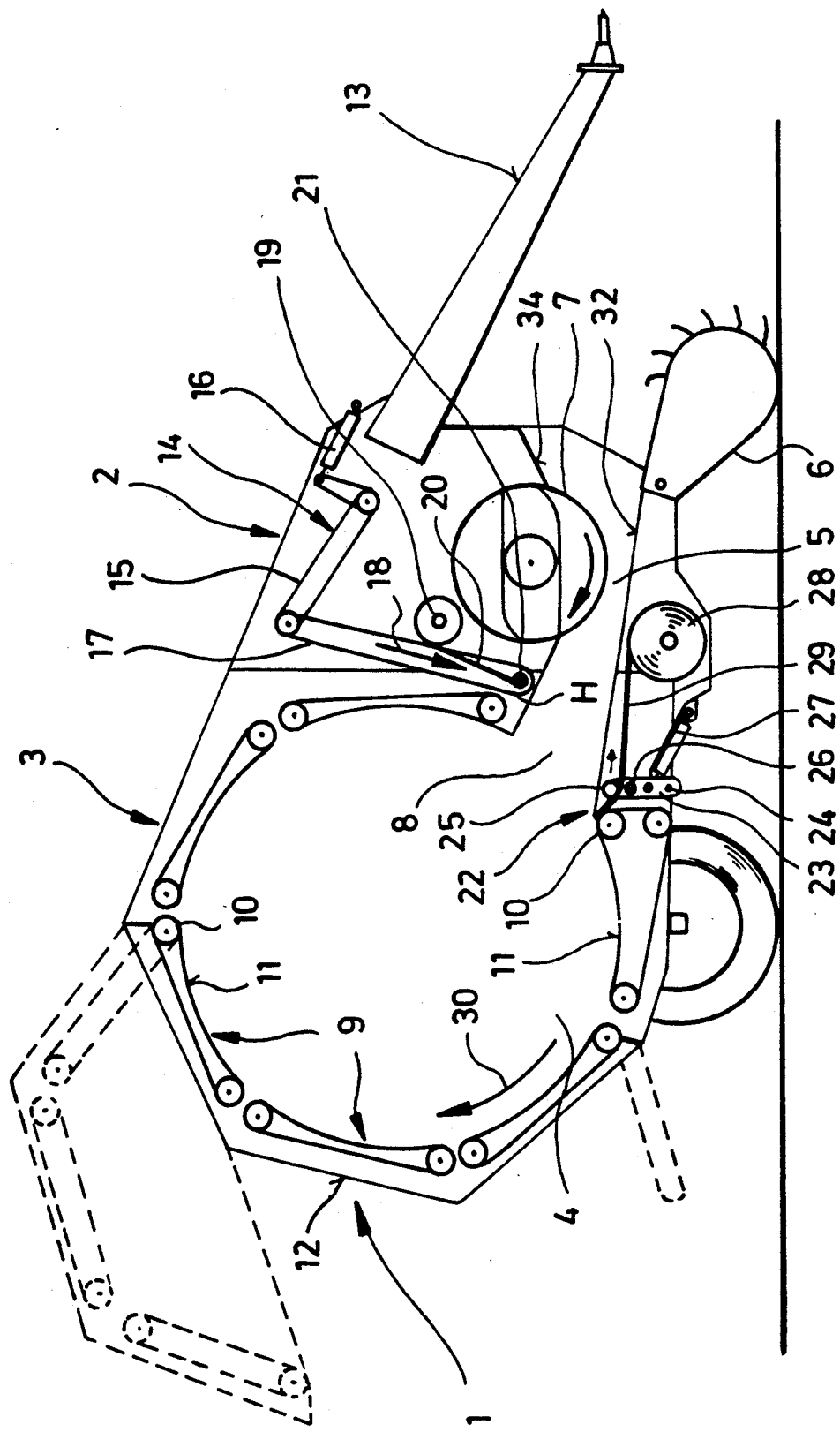
FIG. 1 is a diagrammatical longitudinal sectional view of an apparatus for the handling of a harvest product, specifically a roll baling press, in its operative condition.

Referring to FIG. 1, we provide a roll baler 1 for handling a harvest product, particularly for continuously coiling and tying a harvest product roll bale. The roll baler 1 has a mobile stationary front part 2 and a rear part 3 containing a press chamber 4. The lower portion of front part 2 is provided with a feed passage 5 extending into inlet 8 of press chamber 4. The feed passage 5 has attached to its outer end a first feed element 6. The feed element 6 is attached to the lower portion of the feed passage in the form of a pickup drum having extensible and retractable prongs. A second feed element 7 is positioned upstream of the press chamber inlet 8 and adjacent the upper portion of feed passage 5. The second feed element is shown as a rotatably driven press roller 7 partially projecting into feed passage 5.

Press chamber 4, in the embodiment shown, is of the fixed-volume type. (This may also be of the variable-volume type, if desired). The press chamber is defined by sidewalls (not shown) and a plurality of circumferentially spaced press elements 9. The press elements 9 are driven rollers and belt assemblies 11 which define the substantially circular inner periphery of press chamber 4. Each belt 11 may be a plurality of juxtaposed narrow belts or as a single full-width belt.

At the rear of press chamber 4 opposite feed passage 5, there is a hinged lid 12 hinged to top wall part 3. The lid 12 is adapted to be opened rearward and upwards. It would also be possible, however, to mount lid 12 along its lower edge and to compose it of individual sections adapted during the ejection phase to be straightened so as to form a ramp for the roll bale leaving the press chamber. Alternatively lid 12 might also be a two-leaf construction.

Attached to front part 2 is a draw bar for hitching roll baling press 1 to a tractor. Upwards of feed passage 5 front part 2 carries a lever mechanism 14 comprising crank levers 15 adapted to be actuated by cylinders 16 and carrying a thrust fork 17 for downward displacement in the direction of arrow 18. The lower end of thrust fork 17 forms a retainer H adapted to be moved downwards through feed passage 5. Disposed between thrust fork 17 and press roller 7 is a take-up means 19 for a web 20 having a free end 21. Web 20 is adapted to be unwound with the aid of a drive mechanism or against the force of a rewinding spring. The drive mechanism for take-up means 19 may comprise a reversible hydraulic motor of the variable torque type.

Feed passage 5 has a substantially flat and slightly ascending bottom wall 32 and a top wall 34 of a downwards directed convex profile leading to press roller 7.

Disposed below bottom wall 32 and before the press chamber and before the first roller 10 in press chamber 4 is a tying material feed device 22. As shown in detail in FIG. 10, tying material feed device 22 has a frame 23 adapted to be pivoted by means of a cylinder 27 about a fixed mounting axis 24 between a retracted position (FIG. 10) and a feeding position (FIG. 1). Rotatably mounted in frame 23 are an upper feed roller 25 and a lower back-up roller 26 extending parallel to feed roller 25 and biassed into contact therewith by springs 59. Cylinder 27 is mounted at a stationary position. In the feeding position, feed roller 25 is forced into contact with roller 10, or rather belt 11 of the first press element 9 in press chamber 4. The belt 11 acts as a drive element for feed roller 25. Rotatably mounted below bottom 32 of feed passage 5 is a tying material roll 28 carrying a supply of a tying material 29 to be fed to press chamber 4 by means of feed device 22.

Figure 10:
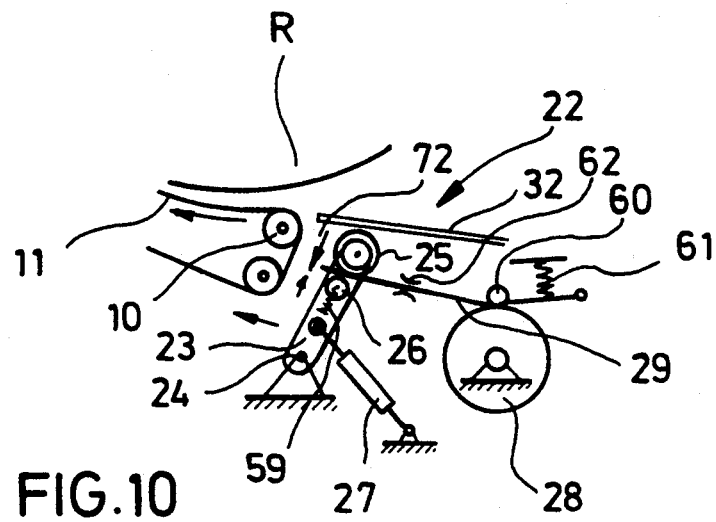
FIG. 10 is a detail of the roll baling press of FIG. 1.

Tying or binding material 29 may be a plastic netting stored in the form of an endless web and adapted to be cut to the required length by a cutter device 72 when feed device 22 is in its retracted position (FIG. 10). Also suitable as tying material is a sheet material or any other web-shaped material. When the employed tying material 29 is a plastic net, the edges thereof may be provided with elastic tensioning elements such as used in a hair net, so that the tying material also covers the lateral edges of the roll bale when it is wrapped around the roll bale. The tying material might also be in the form of longitudinal sections of predetermined length connected to one another at rated breaking points 62. It would also be possible to provide the tying material in the form of separate sections of predetermined length, which are wound onto a core in overlapping relationship, so that they can be unwound one after another.

In the embodiment of feed device 22 according to FIG. 10, there is a spring 59 which permits rollers 25 and 26 to act as a braking device for retaining tying material 29 in such a manner that the traction exerted by the roll bale R adjacent roller 10 is sufficient to tear the tying material at rated breaking point 62. It would also be possible to mount tying material roll 28 in frame 23 in place of feeding roller 25, and to bias it into contact with roller 10 by means of cylinder 27 for unwinding the tying material. Roll 28 may be provided with a braking device such as a braking roller 60 biassed into engagement therewith by a spring 61 or an intermittently operable cylinder for preventing the free rotation of roll 28. Tying material 29 does not necessarily have to be supplied in the form of a roll; it may also be provided in zig-zag-folded and interengaged pre-cut sections contained in a cassette, so that the end of each section pulls the leading end of the next section to a position from which the next section can be advanced when the next roll bale is to be tied.

Operation of roll baler 1 according to FIG. 1 shall now be explained with reference to FIGS. 2 to 5.

Figure 2:
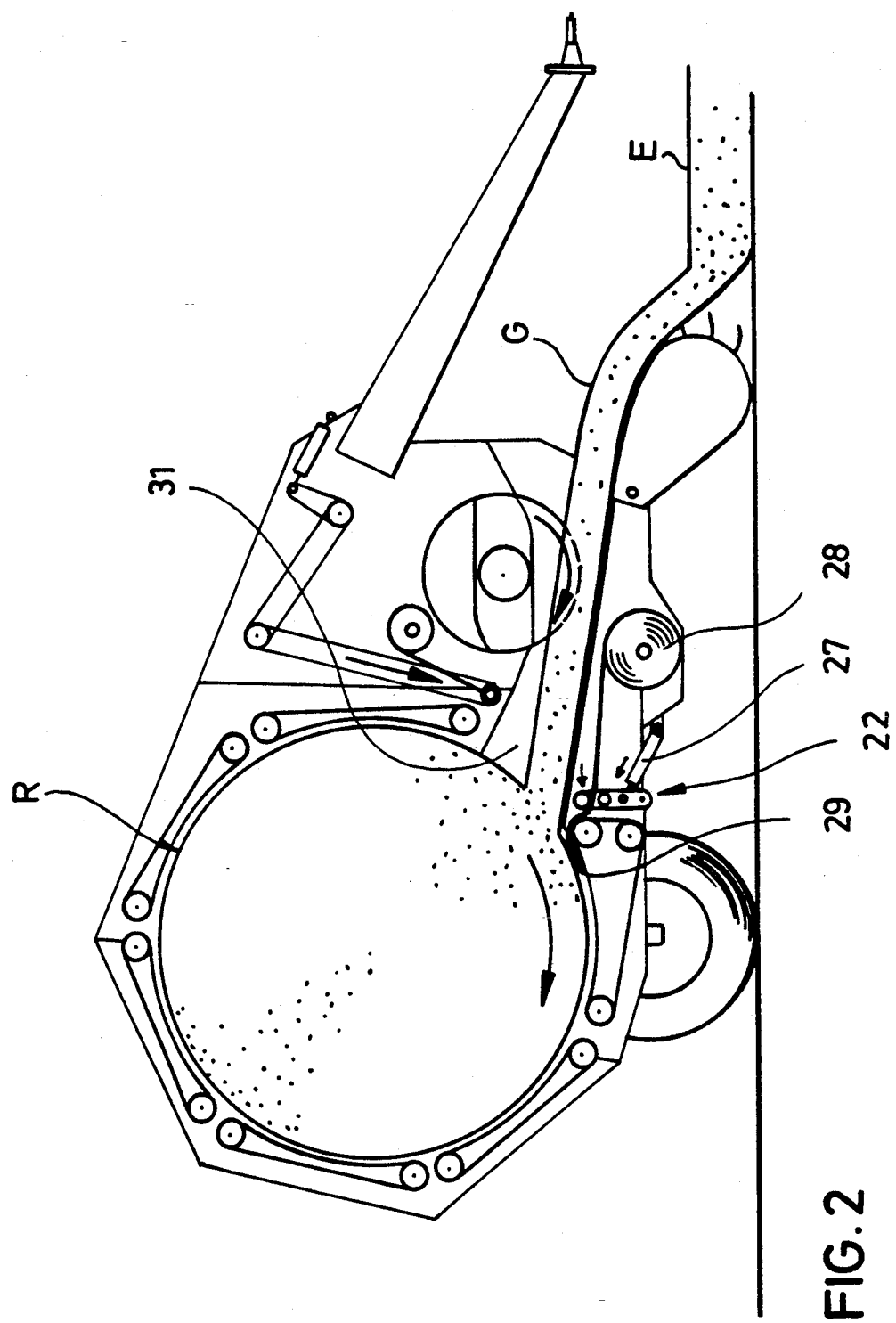
FIG. 2 is the roll baling press of FIG. 1 in an operating phase prior to the completion of a roll bale.

Proceeding from the state shown in FIG. 1, with press chamber 4 empty, first feed element 6 starts to pick up the harvest product E (FIG. 2) lying on the ground and to feed it into press chamber 4 through feed passage 5 and inlet 8. Press roller 7 acts as a second feed element contributing to the formation and continuous advance of a harvest product swath G as shown in FIG. 2. As the harvest product accumulates in press chamber 4, the driven press elements 9 start to impart it with a rotating movement, as a result of which the harvest product swath G is coiled in a spiral configuration under increasing compression.

Figure 3:
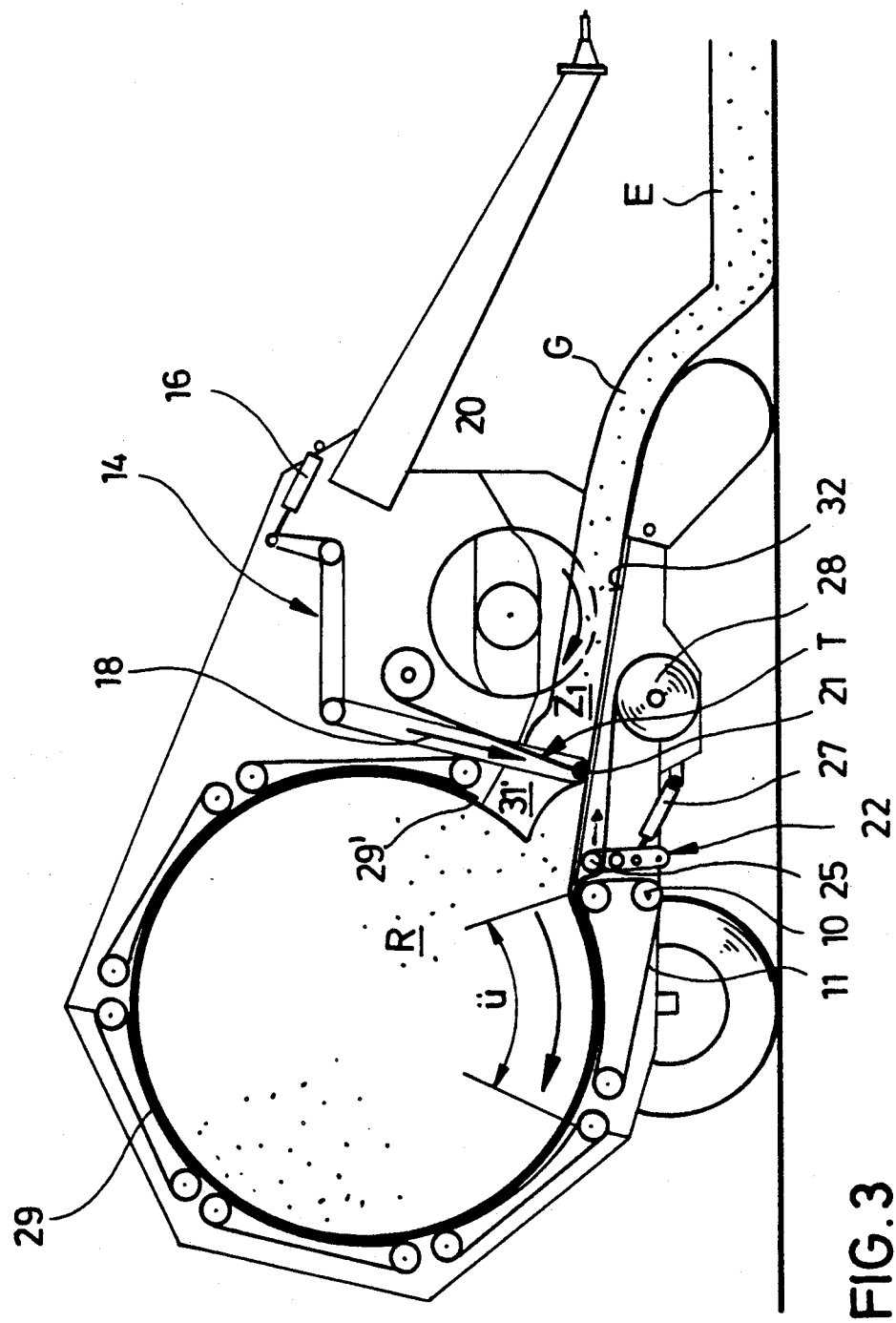
FIG. 3 is the roll baling press in an operating phase on completion of a roll bale.

FIG. 2 shows a roll bale R shortly before its completion. Its completion is determined by (not shown) sensor elements in response to an increasing pressure at the locking mechanism of lid 12. At this time, and with continued supply of the harvest product to press chamber 4, cylinder 27 is actuated to move tying material feed device 22 to its feeding position with feeding roller 25 engaging the first belt 11 adjacent roller 10, so that tying material is advanced between feeding roller 25 and back-up roller 26, and subsequently between feeding roller 25 and belt 11 into a further gap formed between the peripheral surface of roll bale R and first press element 9. The rotating roll bale R cooperates with successive press elements 9 to thereby entrain tying material 29 until the free end 29' thereof reaches a position shortly above inlet 8 as shown in FIG. 3, whereupon feed device 22 is returned to its retracted position. The coiling operation is carried out in the clockwise direction as indicated by an arrow 30 in FIG. 1 Immediately before the free end 29' of tying material 29 reaches inlet 8, cylinders 16 are actuated, causing thrust fork 17 to move downwards in the direction of arrow 18 so as to carry the free end 21 of web 20 down through feed passage 5 to bottom 32 thereof. This causes the harvest product swath G to be interrupted, so that an empty space 31' is created downstream of the longitudinal section of web 20 acting as a separator element T. First feed element 6 and press roller 7 meanwhile continue to feed the harvest product swath along feed passage 5. Press roller 7 acts to compact the harvest product to an increasing degree, resulting in a pre-stored accumulation being created in feed passage 5. During this time the free end 29' of tying material 29 moves across inlet 8 and enters an overlap zone U. At this time press roller 7 continues to compact the harvest product, causing the tensioned web 20 to bulge until it comes into contact with the peripheral surface of the roll bale R. The back-up force exerted on web 20 may also be selected to be strong enough, however, to prevent the web from being pulled out so far that it comes into contact with the still rotating bale R.

As soon as the tying material 29 has formed the overlap zone, it is cut off or otherwise separated. Subsequently lid 12 is opened, and the finished and tied roll bale R is ejected. At this time web 20 forms a loop projecting into press chamber 4 (FIG. 4) to thereby exert an ejecting force on bale R and to form an pre-storing accumulation of growing size within press chamber 4. After the roll bale R has been ejected from press chamber 4, lid 12 is closed again (FIG. 5). The free end 21 of web 20 is retained in the position shown in FIG. 4 until lid 12 is completely closed, resulting in the formation of a loop of increasing size preventing the harvest product from dropping out through the ejection opening.

After lid 12 has been completely closed (FIG. 5), the free end 21 of web 20 is released by retracting thrust fork 17 by means of cylinder 16. The drive mechanism (not shown) for take-up means 19 then acts to rewind web 20 as indicated by arrow 33, so that the pre-compacted harvest product is released and press elements 9 can initiate the formation of the next roll bale. The rewinding of web 20 is continued until its free end 21 is again received in retainer H in the position shown in FIG. 1.

The formation of the new roll bale continues until the state shown in FIG. 2 is attained, whereupon the above described operations are repeated.

FIGS. 6 and 7 show the construction of the press feed roller 7 associated to feed passage 5. A press roller of this type is also useful for employ in other agricultural machines requiring a compaction and uniform feeding of a harvest product. The top wall 34 of feed passage 5 forms a downwards directed arc B and has a plurality of parallel longitudinal slots 40 for the passage therethrough of press blades 41 secured to a roller base member 35 of press feed roller 7. Roller base member 35 has its axis 36 extending parallel to top wall 34 and transversely of feed passage 5, and may be mounted on pivot arms 37 biassed by springs 39 towards a normal position defined by a stop 73. In place of springs 39 it is also possible to employ an adjustable actuator cylinder. Disposed on roller base member 35 (cf. also FIG. 7) are two circumferentially offset groups S and S1 of press feed blades 41 with forwards-facing press faces 42 of a determined width b. Press blades 41 are disposed at predetermined spacings a. The press blades 41 of each group S and S1, respectively, are arranged on roller base member 35 in such a manner that their press faces 42 form an arrow-shaped pattern pointing forwards in the direction of rotation in a developed view of roller base member 35.

This arrow-shaped pattern is effective to laterally displace harvest product from the usually more voluminous center of the swath to result in a uniform feeding and compacting effect over the full width of the swath. As shown in FIG. 7, roller base member 35 has a drive pulley or gear 44 mounted thereon.

Each press face 42 describes a convex arc. In addition, axis 36 of roller base member 35 is offset towards the upstream side of top wall arc B. As a result of this arrangement, a tangent t to each press face 42 at its intersection with top wall 34 as the respective press blade 41 is withdrawn from feed passage 5 includes an angle of less than 9° with top wall 34, as a result of which any harvest product adhering to the press blades is effectively stripped off at the location of slots 40 without being cut or squashed. Press roller 7 may be driven by a hydraulic motor of the adjustable-torque type, with the aid for instance of a chain drive transmission. In the operating phase between FIGS. 3 and 4, i.e. when the harvest product designated at Z1 has been strongly compacted and separator element T has been advanced to a position closely adjacent the periphery of the roll bale or even into engagement therewith, press roller 7 can be displaced upwards against the force of spring 39 to thereby modify the compaction effect and to make room for additional harvest product. The rear edges 43 of press blades 41 are substantially straight in the embodiment shown. Press blades 41 may also be provided in the form of rods with their forwards facing sides acting as press faces.

Figure 8:
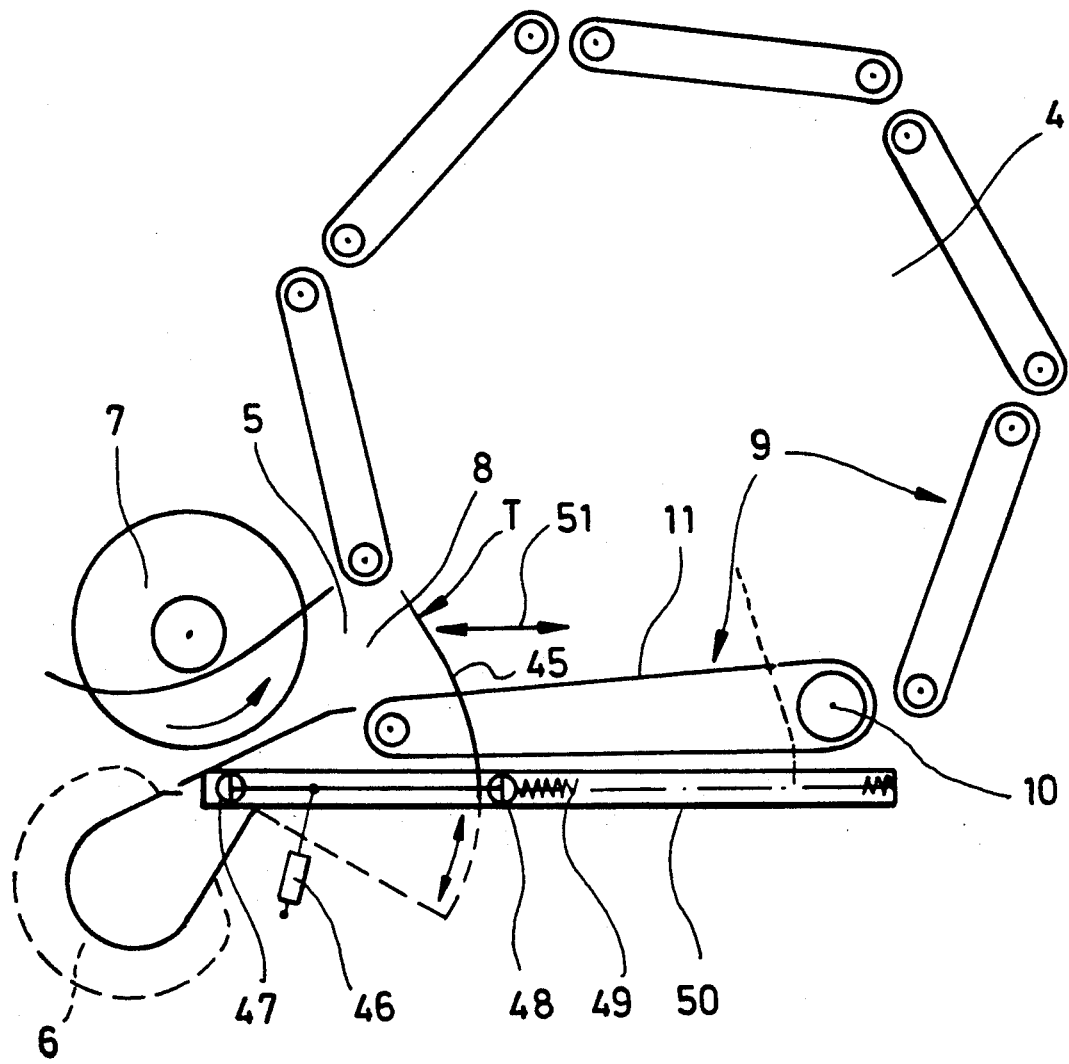
FIG. 8 is a modified embodiment of the roll baling press.

In a modified embodiment of a roll baling press shown in FIG. 8, the web 20 acting as the separator element T is replaced by a rigid rake member 45 adapted to be swung upwards by means of a cylinder 46 from an inoperative position below belt 11 of press element 9 to the back-up position depicted in FIG. 8. Rake member 45 is pivotally mounted in a pivot bearing 47 of a carriage 48, the latter being displaceable against the force of a spring 49 in longitudinal guides extending below press element 9, until rake member 45 has reached the position shown by dotted lines in FIG. 8. This displacement of rake member 45 is indicated by a double arrow 51.

The function of this separator element T is the same as explained with reference to the preceding figures. The harvest product is compacted by press roller 7 and backed up by separator element T until the tying material has been tied. As soon as the tying material has been tied and the ejection of the finished roll bale is initiated, separator element T is displaced towards the ejection opening released by lid 12 so as to prevent the continuously fed harvest product from dropping out. As soon as lid 12 has been closed again, cylinder 46 is actuated to lower rake member 45 before carriage 48 is returned to the initial position as by means of spring 49.

Figure 9:
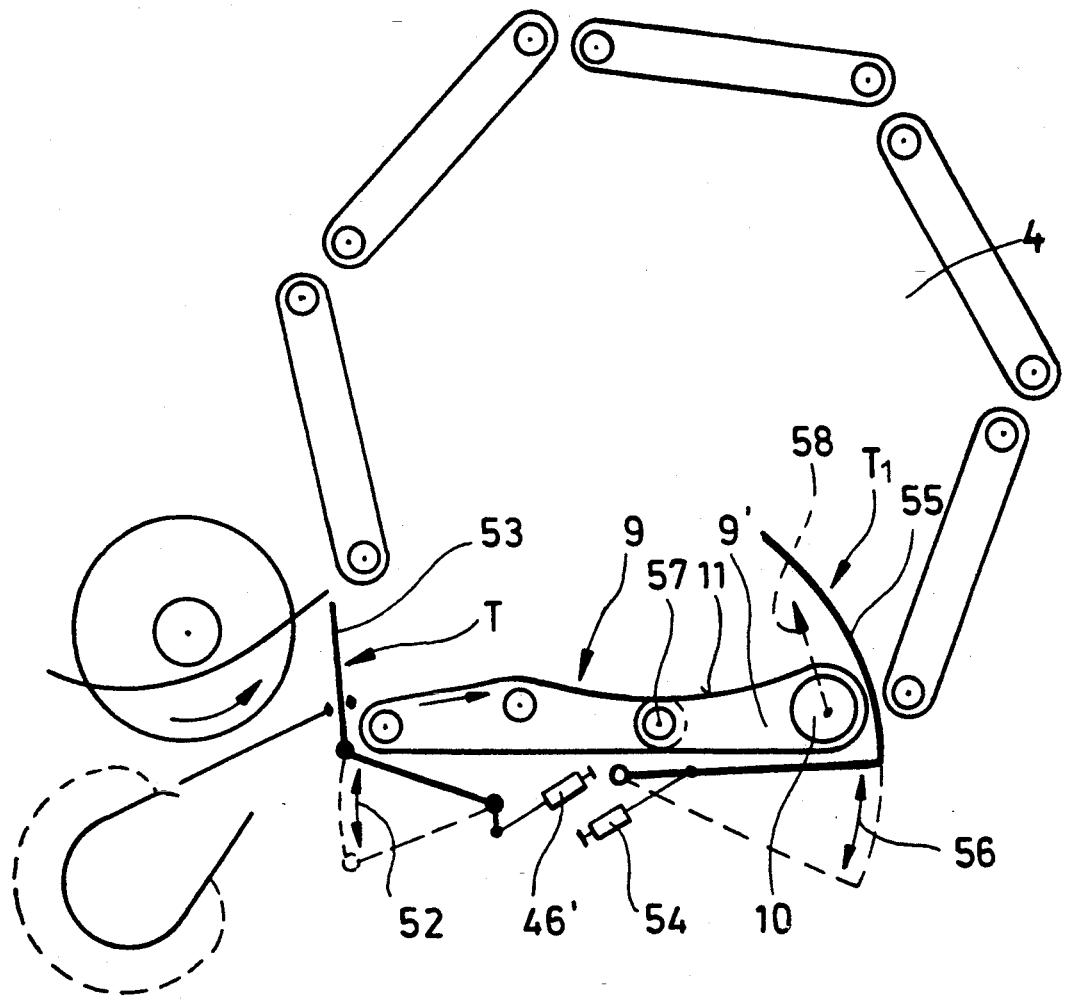
FIG. 9 is still another embodiment of the roll baling press.

The embodiment shown in FIG. 9 is provided with a first and a second separator element T and T1, respectively, each in the form of a rake member 53 or 55, respectively.

Rake member 53 is displaceable back and forth in the direction of a double arrow 52 by means of a cylinder 46' between an inoperative position below the bottom of the feed passage and a back-up position blocking feed passage 5. The first press element 9 in press chamber 4 is of a relatively great length and includes several support rollers 10. The second separator element T1, i.e. rake member 55 is pivotable back and forth in the direction of a double arrow 56 by means of a cylinder 54. In the raised position shown in FIG. 9, rake member 55 prevents the harvest product from dropping out through the still open press chamber opening.

In a modification diagrammatically indicated in FIG. 9, the downstream portion of first press element 9 may be designed to act as the second separator element T1. To this purpose the downstream end portion of first press element 9 including the downstream belt guide roller 10 is adapted to be raised in the direction indicated by an arrow 58 for retaining the harvest product entering press chamber 4 after rake member 53 has been lowered.

Figure 4:
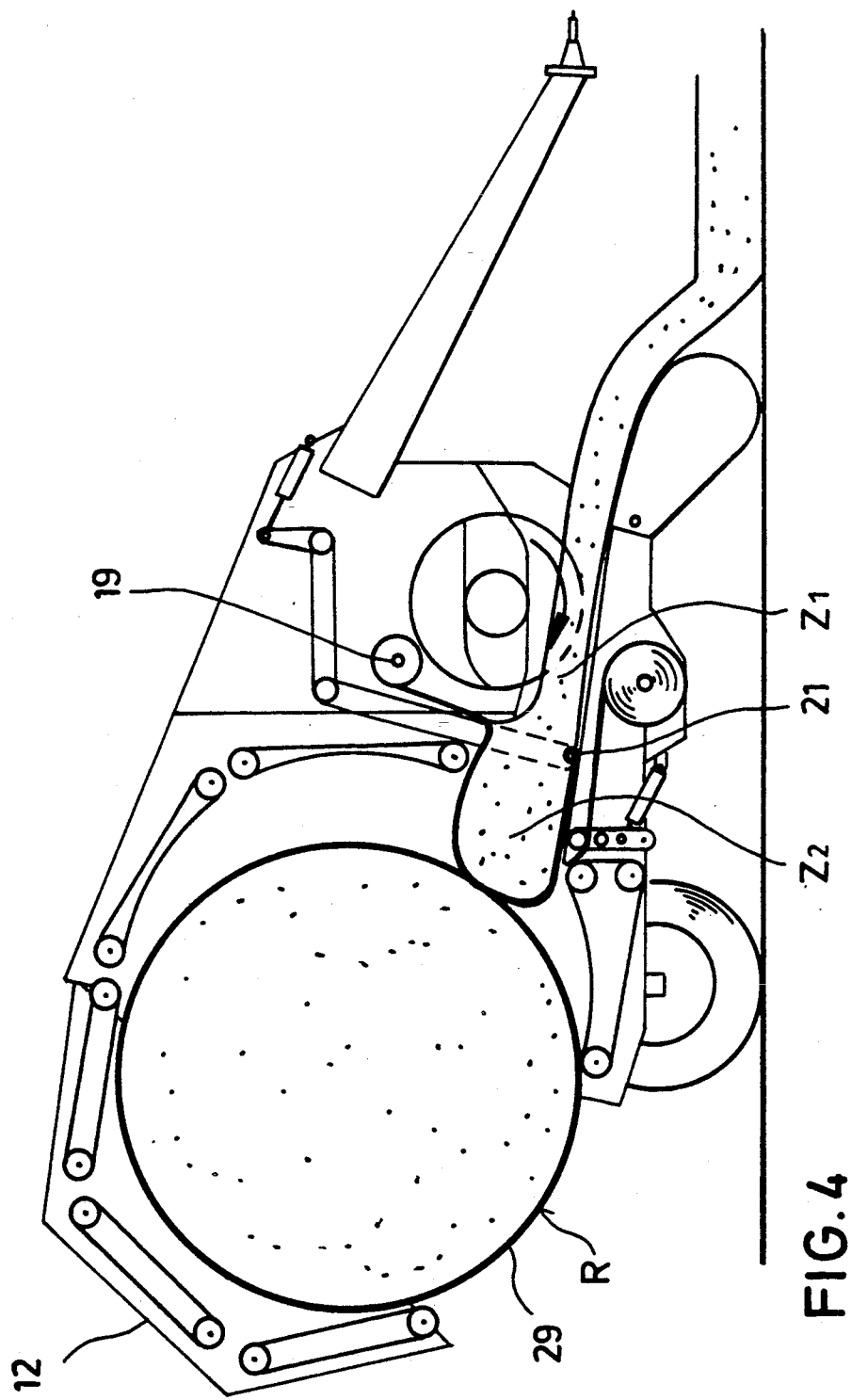
FIG. 4 is the roll baling press during ejection of the finished roll bale.
Figure 5:
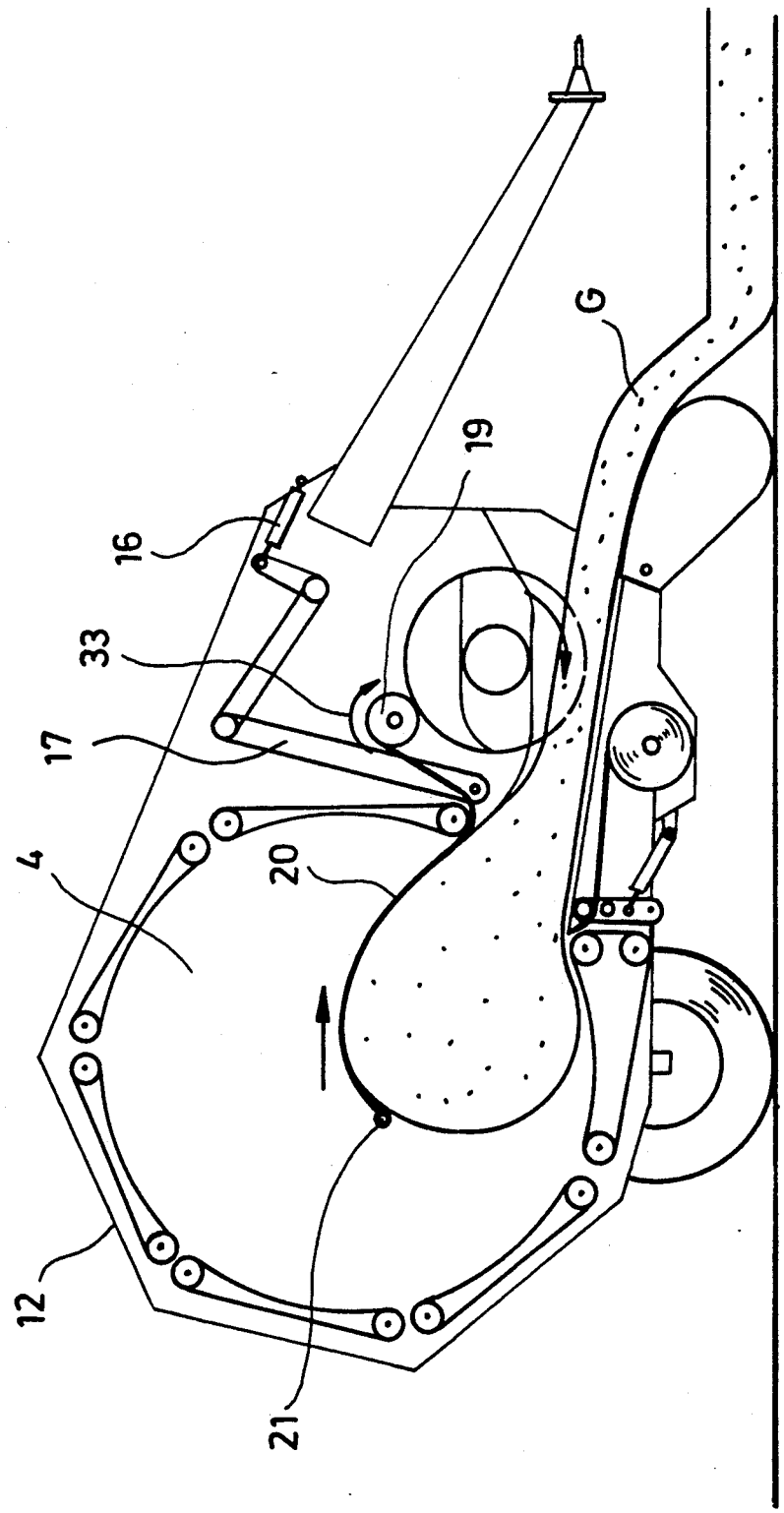
FIG. 5 is the roll baling press in a state immediately receding the coiling of a new roll bale.
Figure 11:
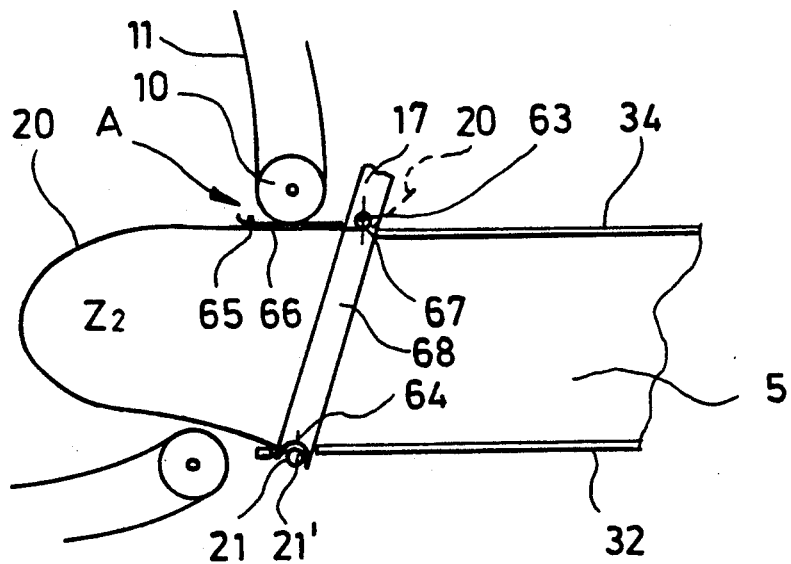
FIG. 11 is another detail of the roll baling press of FIG. 1.

FIG. 11 shows a sectional view of a detail of the roll baler in the operative phase depicted in FIG. 4. Thrust fork 17 has been lowered so as to retain the free end 21 of web 20 provided with catch element 21' in a position extending transversely of feed passage 5 adjacent bottom wall 32. To this purpose the lower ends of fork prongs 68 are each formed with a downwards opening retainer claw 64 for retaining the catch element 21' formed as a rod extending transversely over the full width 20. Web 20 and catch element 21' are of substantially the same width as feed passage 5.

Thrust fork 17 further has a cross member 63 disposed at 25 the level of top wall 34 of feed passage 5 and acting to deflect web 20. Cross member 63 may also be replaced by a deflector roller or the like supported adjacent the end of feed passage 5.

Adjacent the upstream end of inlet 8 in the winding direction 30 deflector means A is provided for avoiding frictional contact of web 20 with belt, or belts 11, or roller 10 of the respective press element 9.

In the embodiment according to FIG. 11, deflector means A comprises a flap 66 pivotally mounted on thrust fork 17 about a transverse axis 67 and engageable with respective stops 65 mounted for instance on the side walls within press chamber 4. The pressure of the harvest product in the loop formed by web 20 acts to hold flap 66 in engagement with stops 65, so that flap 66 acts as a slide bearing surface for web 20. Retraction of thrust fork 17 also causes flap 66 to be retracted from this position. It is also possible to omit stops 65, so that flap 66 is directly supported on belt 11. The friction between belt 11 and flap 66 is less than the friction between belt 11 and web 20, the latter being for instance of a PVC material.

Figure 12:
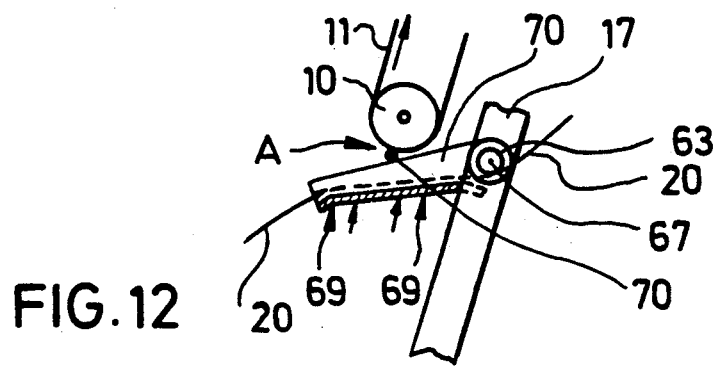
FIG. 12 is still another detail of the roll baling press of FIG. 1.

FIG. 12 shows another embodiment of deflector means A, comprising a flap 69 mounted on thrust fork 17 for pivoting about an axis 67 and stiffened by lateral flanges 70 adapted to be engaged with stops 71. In this embodiment flap 69 supports web 20 from below, so that web 20 rests on flap 69 and is thus not exposed at this location to the pressure of the harvest product during the second pre-storing step. The deflector means has to be designed so as to ensure that the catch element 21' provided at the free end 21 of web 20 is reliably received in the retaining claws 64 of thrust fork 17 in its retracted position as web 20 is subsequently retracted.

The separation of web 20 from belt or belts 11 may also be ensured by a transverse plate member fixedly mounted in press chamber 4 for guiding web 20 in such a manner that it does not come into direct contact with press element 9 as these two components move in opposite directions when web 20 is retracted, and that frictional pressure engagement between web 20 and belt or belts 11 is reliably avoided.

I claim:

1. Apparatus for forming a cylindrical bale of cut harvest product, comprising a harvest product feed passage leading to a coil and press chamber, defined by sidewalls and press elements driven in a coiling direction and an ejector lid, said ejector lid adapted to be moved back and forth between a closed position and an open position, a first feed element mounted at the entrance of said feed passage, a second feed element mounted at an intermediate location of said feed passage between said first feed element and an inlet, of said press chamber, a tying material feed device disposed downstream of said inlet, a separator element to divide cut harvest product baled in said press chamber from cut harvest product being pre-stored in said feed passage, said separator element movably mounted between said second feed element and said inlet for displacement from an inoperative position outside of said feed passage to an operative position across said feed passage, said second feed element is a continuously driven press cylinder equipped with press blades, and said separator element in its operable position is movable together with said harvest product to move from said feed passage through said inlet into said press chamber.

2. Apparatus according to claim 1, wherein said separator element is an extensibly mounted flexible web having a free end positioned above said feed passage when in its inoperable position and its free end fixedly retained to a bottom portion of said feed passage when in its separable position, said flexible web having a longitudinal section supported between opposite walls of said feed passage in the operative position, the length of said longitudinal section being extendable to form said web into a loop extending into said press chamber.

3. Apparatus according to claim 2, wherein said web is stored in a coil, upstream of said inlet, the free end of said web being releasably anchored in a retainer, said retainer being connected to a mechanism and movable therewith and with said free end from a position adjacent an upper wall of said feed passage to a location at the opposite lower wall of said feed passage.

4. Apparatus according to claim 3, wherein a rigid catch element is secured within the free end of said web and that said retainer comprises preferably open retainer claws for said catch element.

5. Apparatus according to claim 4, wherein said catch element is adapted to be fixedly engaged with said retainer claws by a retraction tension induced in said web.

6. Apparatus according to claim 4, wherein said catch element is a rod or a pipe.

7. Apparatus according to claim 3, characterized in that said mechanism comprises a thrust fork having fork prong ends acting on said retainer and having a cross beam disposed at a distance above said fork prong ends corresponding at least to the height of said feed passage at the insertion location of said retainer, that said fork prongs are movable transversely through said feed passage adjacent sidewalls thereof, and that said thrust fork is secured to crank levers pivotally mounted in the apparatus and movable by means of at least one cylinder.

8. Apparatus according to claim 2, wherein the longitudinal section of said web closes said feed passage, said web is adapted to be supported between support locations in the feed passage, by tensioning the web.

9. Apparatus according to claim 2 wherein said web is selected from one of 2 grounds of reinforced rubber, a plastic material, a woven fabric of a textile material, metal wires, a plastic-coated woven fabric, and plastic coated metal.

10. Apparatus according to claim 2 wherein a deflector device for said web is provided upstream of said inlet.

11. Apparatus according to claim 1, wherein said tying material feed device includes a tying material storage means mounted in a stationary front portion of the baler, said tying material feed device cooperates with a press element in said press chamber for feeding tying material and to apply said tying material to a roll bale periphery, a rotatably drivable feed roller, said feed device is movable back and forth between a feeding position and a retracted position, said feed roller in said feeding position is adapted to engage with said press element to be rotated thereby and to define with said press element a continuous feed roller gap for said tying material extending over the width of the press chamber.

12. Apparatus according to claim 11, wherein said feed roller is formed by said tying material itself wound onto a winding core.

13. Apparatus according to claim 12, wherein a back-up roller is provided parallel to said feed roller, and said back-up roller is resiliently biassed into engagement with said feed roller.

14. Apparatus according to claim 13, further comprising a separating device for said tying material adapted to be moved into engagement with said tying material in the retracted position of said tying material feed device.

15. Apparatus according to claim 11, wherein said feed roller is mounted in a tiltably mounted frame engaged by a tilt actuator, preferably a cylinder.

16. Apparatus according to claim 15, wherein said feed roller is disposed in said inlet of said feed passage at the downstream inlet side in the coiling direction.

17. Apparatus according to claim 11, wherein said tying material held in said binding material store is selected from one of separate and mutually overlapping tying material sections of predetermined equal length and tying material sections of predetermined equal length interconnected at rated breaking points, and that for separating said tying material section said tying material store is adapted to be acted on by one of a braking device and said feed roller cooperating with said back-up roller to act as a braking device.

18. Apparatus according to claim 1, wherein said separator element is a rigid rake wall adapted to be displaced substantially parallel to itself through said inlet into said press chamber from said inoperative position to said operative position.

19. Apparatus according to claim 1, wherein in addition to said separator element in said feed passage, a further separator element is provided in front of the opening of said lid adjacent said press chamber and adapted to be displaced into said press chamber.

20. Apparatus according to claim 1 wherein said second feed element is a press roller having a roller base member and at least one group of press blades disposed at spaced locations in the longitudinal direction of said roller base member, each said press blade having a press face facing forwards in the direction of rotation and having a convex arcuate shape directed rearward of the direction of rotation, the press faces of adjacent press blades being offset relative to one another in the circumferential direction, so that in a developed view of said press roller said base member, said press faces form an arrow-shaped pattern with the arrow point facing in the direction of rotation.

21. Apparatus according to claim 20, wherein a plurality of press blade groups are provided in the circumferential direction of said roller base member.

22. Apparatus according to claim 20 wherein said roller base member is disposed outside of said feeder passage and that said press blades extend into said feeder passage through slots formed in a feed passage wall parallel to their planes of rotation.

23. Apparatus according to claim 20 wherein the arcuate shape of each press face has a profile resulting in a tangent to said press face enclosing an acute angle with a feed passage wall at the intersection of said press face and aid feed passage wall as said press blade leaves said feeder passage.

24. Apparatus according to claim 23 wherein at the location of said press roller said feed passage wall extends parallel to said roller base member with an arc facing towards said harvest product, and that the axis of said roller base member is disposed in the forwards portion of said arc in the feeding direction of said harvested product through said feeder passage.

25. Apparatus according to claim 24 wherein said press roller is yieldingly movable relative to said feed passage wall of said feeder passage under reaction pressure of said harvest product, and is preferably biased by springs into a normal position.

* * * * *